3,004,421
ANTI-THEFT DEVICE FOR TRAILERS
William Bowler, St. Laurent, Quebec, Canada, assignor to Canadian National Railway Company, Montreal, Quebec, Canada
Filed Mar. 28, 1960, Ser. No. 18,137
Claims priority, application Canada Mar. 24, 1960
2 Claims. (Cl. 70—232)

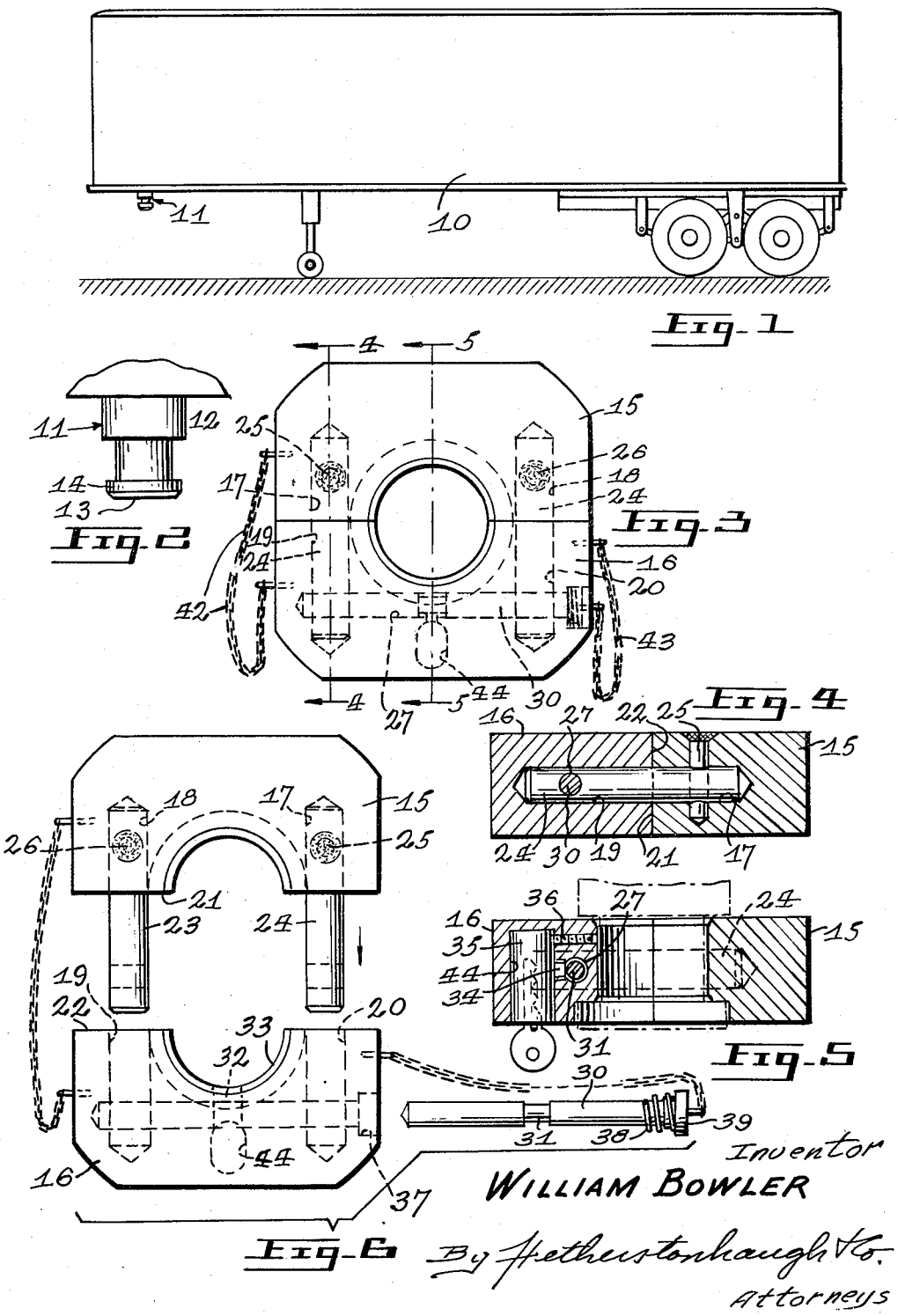

The present invention relates to a device for preventing theft by attachment to a towing vehicle, of a semi-trailer of the type comprising a king-pin adapted to be hitched to a towing vehicle, commonly known as a prime mover. When such semi-trailers are left unattended, they can be quite easily highjacked by hitching them to a prime mover supplied by the thieves themselves.

In order to make this impossible, or at least much more difficult, there is provided, in accordance with the present invention, a device consisting of a collar which fits on the king-pin of the semi-trailer, so that the king pin cannot be used to hitch the semi-trailer to the coupling of a prime mover. Means are furthermore provided to lock the collar on the pin.

When the device according to the invention is used on a semi-trailer, the highjackers must either remove the collar, for example by cutting through it or provide other means for removing the trailer. Either of these operations is lengthy and laborious, and greatly increases the chances of apprehension.

An embodiment of the invention is illustrated by way of example in the accompanying drawings, in which:

FIG. 1 is a side view of a semi-trailer of the type to which the invention is applicable;

FIG. 2 is an enlarged side view of the king-pin of the semi-trailer;

FIG. 3 is a top plan view of a device according to the invention;

FIG. 4 is a section on line 4—4 of FIG. 3;

FIG. 5 is a section on line 5—5 of FIG. 3; and

FIG. 6 is an exploded view bottom plan, of the parts of the device.

The semi-trailer 10 shown in FIG. 1 is of a conventional type provided with a king-pin 11 at its forward end. The king-pin is shown in greater detail in FIG. 2, and consists of a cylindrical body having an annular groove 12 spaced from its free end 13, the part between the groove 12 and the end 13 constituting a relatively thin flange 14.

The device according to the invention comprises two parts 15 and 16, which, when assembled, form a collar fitting closely around the groove 12 and the flange 14, as shown in FIG. 5. Each collar part 15 and 16 is provided with a pair of parallel, equally spaced sockets 17, 18 and 19, 20 respectively perpendicular to the face 21, 22 respectively of each part, which face fits on the other part (FIG. 6). A pair of dowels 23, 24 are inserted in the sockets 17 and 18 respectively of part 15, and are secured therein by means of pins 25, 26 fitting in holes extending through the collar part 15 and the dowels. The dowels 23 and 24 are thus permanently assembled with the part 15, and are adapted to fit in the sockets 19 and 20 of part 16, when the two parts are assembled together to form the collar.

Part 16 has drilled therein a hole 27 which intersects the sockets 19 and 20 at a right angle. The dowels 23 and 24 have holes 28, 29 respectively, which register with the hole 27, and a locking pin 30 is adapted to be inserted in the holes 27, 28 and 29, thus preventing separation of the two parts of the collar.

The locking pin 30 (FIG. 6) has at its center an annular groove 31 which in the assembled position of the locking pin registers with a bore 32, drilled from the inside collar face 33 of part 16. The bolt 34 of a lock 35, inserted in a suitable recess 44 of the part 16, slides in the bore 32 and is adapted to engage the annular groove 31 of the locking pin 30, so as to lock the parts together. The lock 35 is held in place by a set screw 36 (FIG. 5) which is screw-threaded into the part 16 from the inside collar face 33.

The hole 27 for the locking pin 30 has at its outer end an enlarged portion 37 adapted to contain a spring 38 which surrounds pin 30 and which bears against a head 39 of the locking pin 30. When the locking pin is in locked position with its groove 31 engaged by the bolt 34, the head 39 lies flush with the adjacent face of the part 16, as shown in FIG. 3.

To hold the parts of the device together when not in use, a chain 42 is loosely secured to the two parts 15 and 16, and another chain 43 connects the locking pin 30 with the collar part 16.

The embodiments of the invention in which an exclusive property or privilege is claimed are defined as follows:

1. An anti-theft device for trailers of the type provided with a king-pin having an annular groove intermediate its ends and adapted to be coupled to a prime mover; said device comprising a two-part collar, each part being provided with a semi-circular recess adapted to be fitted about said king-pin and in said groove with opposing faces of each collar part in abutting relation, a pair of dowels projecting from the face of one of said parts of said collar, the other of said parts being provided in its face with a pair of sockets adapted to slidably receive said dowels when said collar parts are fitted together, a hole in said other collar part intersecting said pair of sockets, a locking pin adapted to fit in said last mentioned hole, said dowels also being provided with holes adapted to receive said locking pin when said collar parts are fitted together, and means for locking said locking pin on said other collar part.

2. An anti-theft device according to claim 1, wherein said hole of said other collar part adapted to receive said locking pin has an enlarged portion at its outer end, said locking pin has a head at its outer end adapted, when in locked position, to fit in said enlarged hole portion flush with the adjacent face of said other collar part, and a compression spring surrounding said pin and located in said enlarged hole portion to bear against said head.

References Cited in the file of this patent

UNITED STATES PATENTS

| 1,409,106 | Hess | Mar. 7, 1922 |
| 2,656,706 | Lucas et al. | Oct. 27, 1953 |
| 2,785,564 | Rossi | Mar. 19, 1957 |

FOREIGN PATENTS

| 428,747 | Germany | May 10, 1926 |
| 628,058 | Great Britain | Aug. 27, 1949 |